INVENTOR
LOEBE JULIE

_United States Patent Office_

3,517,303
Patented June 23, 1970

3,517,303
CIRCUIT FOR PRODUCING A SYNTHESIZED IMPEDANCE
Loebe Julie, New York, N.Y., assignor to Julie Research Laboratories, Inc., New York, N.Y., a corporation of New York
Continuation-in-part of application Ser. No. 761,488, Sept. 23, 1968. This application May 1, 1969, Ser. No. 826,770
Int. Cl. G01r 15/08
U.S. Cl. 323—100                   12 Claims

ABSTRACT OF THE DISCLOSURE

A circuit is utilized to produce selectable values of a synthesized electrical impedance. The circuit includes a high-gain amplifier, an impedance of fixed value, and a transfer ratio device characterized by a fixed impedance between two terminals, a variable predetermined transfer ratio, and a variable impedance between two other terminals. In a second embodiment, two such transfer ratio devices are utilized.

---

Figure 1:
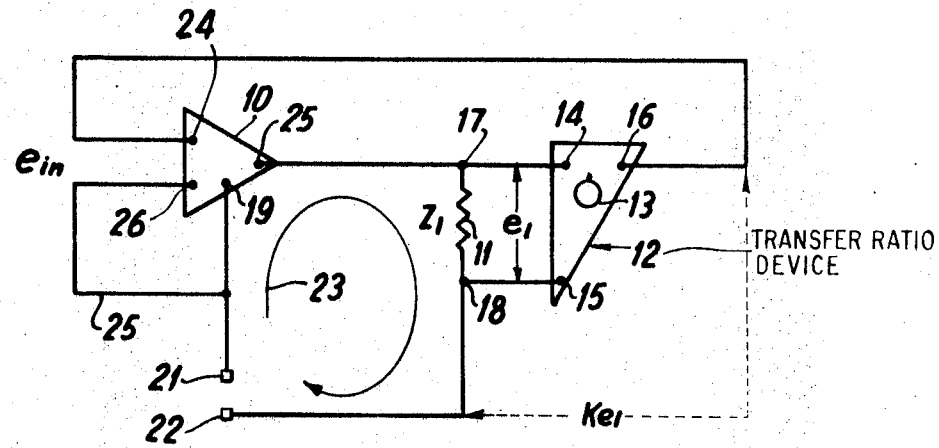

This application is a continuation-in-part application based upon application Ser. No. 761,488, of the same title, filed Sept. 23, 1968, now abandoned.

The present invention relates to electrical testing instruments and more particularly to a circuit for the synthesis of impedance.

The growing technological sophistication of the electronics industry has created a demand for more precise test and measuring instruments. One type of instrument whose precision is its very reason for existence is an impedance synthesizer. Such an instrument may be adjusted, for example, by a dial, to provide a desired value of an impedance, such as resistance, within the range of the instrument.

A selectable synthetic impedance is useful in performing various electrical tests. For example, it may be used to calibrate an electrical bridge, as an element in a resistance bridge, or as an accurate decade box.

The two difficulties with presently available synthetic impedance instruments are their accuracy and their cost. An inexpensive instrument is not accurate and a reasonably accurate instrument is expensive. A superior commercially available instrument has an accuracy of about .005% (50 parts per million) and may cost about a couple of thousands of dollars.

It is the ojective of the present invention to provide an electrical instrument for the adjustable synthesis of impedance which is highly accurate, has a high resolution, and is of a reasonable cost.

Figure 2:
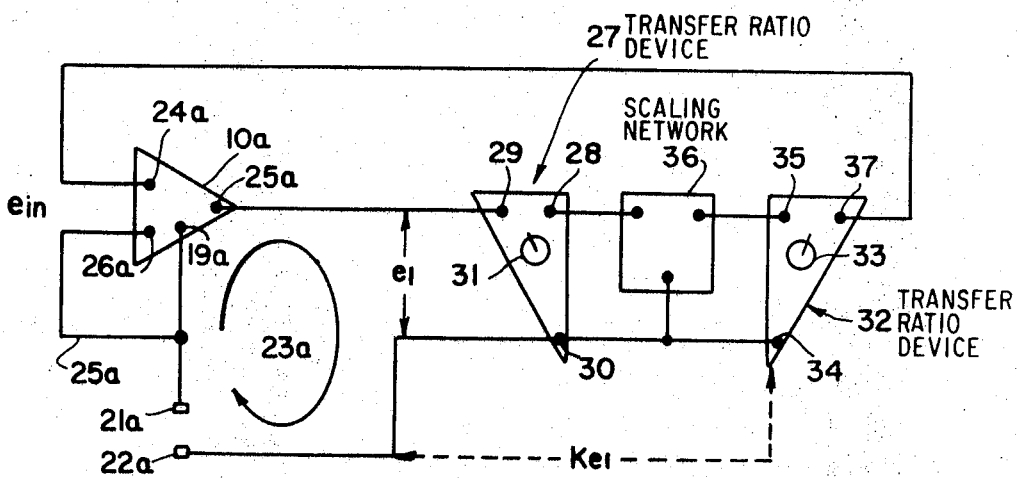

Other objectives of the present invention will be apparent from the detailed description of the preferred embodiment which follows, taken in conjunction with the accompanying drawings. In the drawings:

FIG. 1 is a schematic diagram of the circuit of the first embodiment of the present invention; and
FIG. 2 is a schematic diagram of the circuit of FIG 2 of the present invention.

The circuits shown in the drawings are of instruments to synthesize impedance. In the circuit of FIG. 1, the specific impedance synthesized is resistance. This description, however, shall also explain the synthesis of capacitance and inductance.

The circuit shown in FIG. 1 includes an amplifier 10. The amplifier is a high-gain amplifier having a low off-set voltage and a low off-set current, the input to the amplifier 10 being designated $e_{in}$. The output terminal 25 of amplifier 10 is connected to one terminal 17 of fixed resistor 11. Resistor 11, for example, of 100,000 ohms, has an impedance $Z_1$. The voltage across resistor 11 is $e_1$. Both terminals 17 and 18 of resistor 11 are connected to the transfer ratio device having adjusting means 13.

The transfer ratio device 12 is chararacterized by (1) a constant impedance across its terminals 14 and 15, for example, of 100,000 ohms; (2) a linear adjusting means 13 having a high resolution, such as a dial, to vary its transfer ratio; (3) a variable impedance, depending upon the setting of the adjusting means 13, across its terminals 15 and 16. The adjusting means need not be linear but may be predetermined in some other fashion. A suitable form of transfer ratio device is a Kelvin-Varley voltage divider using precision resistors, as described in the applicant's United States Letters Patent 3,179,880 at FIG. 7. Such a transfer ratio device may have a wide range of impedance and a resolution to eight places. The output voltage of the transfer ratio device 12, across its terminals 15 and 16, is $Ke_1$. K is the transfer ratio determined by the setting of the transfer ratio device. The terminal 18 of resistor 11 is connected to the test terminal 22, which may be a connector lead. The second test terminal 21 is connected to output terminal 19 of amplifier 10 by a common connection 25 between its input 26 and output terminals 19. The test terminals 21 and 22 provide across them the desired synthesized impedance. Terminal 16 of the transfer ratio device 12 is connected to input terminal 24 of the amplifier 10.

The flow of current in relationship to those leads and resistor 11 is indicated by current loop 23. Resistor 11 may be omitted, in which case the effective resistance between terminals 17 and 18 is infinite.

To synthesize capacitance in place of resistance, one replaces the resistor 1 with a capacitor and utilizes a capacitance transfer ratio device. To synthesize inductance across the test terminals, one replaces the resistance 11 with an inductor and utilizes a ratio transformer as the transfer ratio device.

The following formulae show that the value of the impedance may be synthesized to an accurate desired value. Using the terms indicated, in connection with the figure, in which:

$e_1$=voltage at output of voltage divider
I=current in loop 23
V=voltage across terminals 21 and 11
$Z_1$=impedance of resistor 11
K=transfer ratio of voltage divider
$Z_{in}$=input impedance of the transfer ratio device
$Z_p$=$Z_{in}$ in parallel with $Z_1$ (1) $$e_1 = IZ_p$$

(2) $$V + e_{in} = Ke_1$$

(3) $$e_{in} = \frac{V + IZ_p}{A} + \Delta e$$

$\Delta e$ is very small as the amplifier is selected to have a low off-set voltage.

(4) $$V + e_{in} = K[IZ_p]$$

(5) $$A \cdot V + \frac{V + IZ_p}{A} = K[IZ_p] \cdot A$$

(6) $$V(A+1) + IZ_p = K[IZ_p] \cdot A$$

(7) $$\frac{V}{IZ_p} = \frac{K \cdot A - 1}{A+1} = \frac{-1-K}{1+A} + K$$

where (8) $$A+1$$

i.e. very large so $$\frac{-1-K}{1+A}$$

becomes insignificant (9) $\quad \frac{V}{IZ_p} = K$ or $\frac{V}{I} = KZ_p = Z$ equivalent Z equivalent, which is the synthesized impedance across the terminals 21 and 22, is a linear function with respect to the adjustable transfer function K and has a maximum value of $Z_p$.

In the circuit of FIG. 2 the single transfer ratio device 12 of FIG. 1 is replaced, but the circuit is, in many respects, the same, the parts labeled $a$ being the same as the similarly numbered parts of FIG. 1.

In the circuit of FIG. 2 a first transfer ratio device 27 and a second transfer ratio device 32 have the same characteristics as transfer ratio device 12 of FIG. 1. The transfer ratio $K_1$ of device 27 is set by dial 31 and the transfer ratio $K_2$ of device 32 is set by dial 33. An active ratio network 36 is connected between terminal 28 of transfer ratio device 27 and terminal 35 of transfer ratio device 32. The ratio network 36 may be used for scaling (the change of ranges) or to change the sign of the simulated impedance by plus to negative, or vice versa.

The balance equation for the circuit of FIG. 2 is shown below. In that equation:

$(Zin)_1$=impedance between terminals 28 and 30 of transfer ratio device 27
$K_1$=transfer ratio of transfer ratio device 27
$(Zin)_2$=impedance between terminals 36 and 34 of transfer ratio device 32
$K_2$=transfer ratio of transfer ratio device 32
$Z_{36}$=impedance across terminals of network 36
$Z'$=impedance across terminals 29 and 30 of transfer ratio device 27, i.e., the synthesized impedance.

$(Zin)_1 \| (Zin)_2$ means the impedance across them when they are connected in parallel At balance: $Z' = (Zin)_1 \| (Zin)_2 \| Z_{36} \cdot K_1 \cdot K_2$ A negative impedance $Z'$ can be obtained by changing sign of $Z_{36}$. The synthesized impedance may be adjusted by varying $K_1$ or $K_2$, or both.

In the embodiment of FIG. 2, the impedance network 36 may be a two-terminal or three-terminal passive impedance such as a resistance network. Alternatively, the network 36 may have gain, with or without phase reversal. If the system is A.C., a negative impedance may be provided by the network 36 being a transformer with reversed polarity. If the system is D.C., a negative impedance may be provided by the network 36 being an amplifier with phase reversal.

I claim:

1. An instrument for the synthesis of impedance including an amplifier having a high gain and input and output terminals; a transfer ratio device having at least three terminals, said transfer ratio device being characterized in having an essentially constant impedance between a first pair of terminals, a predetermined transfer ratio, and a variable impedance between a second pair of terminals; and two impedance output terminals across which the synthesized impedance is produced; said output impedance terminals connected into a closed loop with said fixed impedance pair of terminals and said amplifier output terminals, wherein the input of said amplifier is connected to a variable impedance terminal of said transfer ratio device.

2. An instrument as in claim 1 wherein a fixed impedance is connected in parallel with the said first pair of terminals.

3. An instrument as in claim 1 wherein the amplifier has a low off-set voltage.

4. An instrument as in claim 2 wherein the fixed impedance is a resistor.

5. An instrument as in claim 1 wherein the transfer ratio device is a Kelvin-Varley voltage divider.

6. An instrument as in claim 1 wherein the transfer ratio device has coupled to it a predetermined scale to indicate its transfer ratio.

7. An instrument for the synthesis of impedance including an amplifier having a high gain and input and output terminals; first and second transfer ratio devices each having at least three terminals, each of said transfer ratio devices being characterized in having an essentially constant impedance between a first pair of terminals, a predetermined transfer ratio, and a variable impedance between a second pair of terminals; and two impedance output terminals across which the synthesized impedance is produced; said output impedance terminals connectable into a closed loop with said variable impedance pair of terminals of said first transfer ratio device and with said amplifier output terminals, wherein the two pairs of terminals having a constant impedance are connected in series, and wherein the input of said amplifier is connected to a variable impedance terminal of said second transfer ratio device.

8. An instrument as in claim 7 wherein an impedance means is connected between the two pairs of terminals having a constant impedance, for the purpose of scaling.

9. An instrument as in claim 7 wherein a three-terminal transfer ratio means, active or passive, is connected, for the purpose of scaling or providing a negative impedance, between the two pairs of terminals having a constant impedance.

10. An instrument as in claim 7 wherein the amplifier has a low off-set voltage.

11. An instrument as in claim 7 wherein the transfer ratio devices are Kelvin-Varley voltage dividers.

12. An instrument as in claim 7 wherein the transfer ratio devices have coupled to them a predetermined scale to indicate their transfer ratio.

References Cited

UNITED STATES PATENTS 3,160,831   12/1964   Merrill et al.   333—32 X
3,320,526   5/1967   Julie   324—62 X J D MILLER, Primary Examiner
A. D. PELLINEN, Assistant Examiner U.S. Cl. X.R.
324—62